Feb. 19, 1924.
H. A. PAQUETTE
GAS IRON HOSE CONNECTER
Filed March 2, 1922
1,484,528
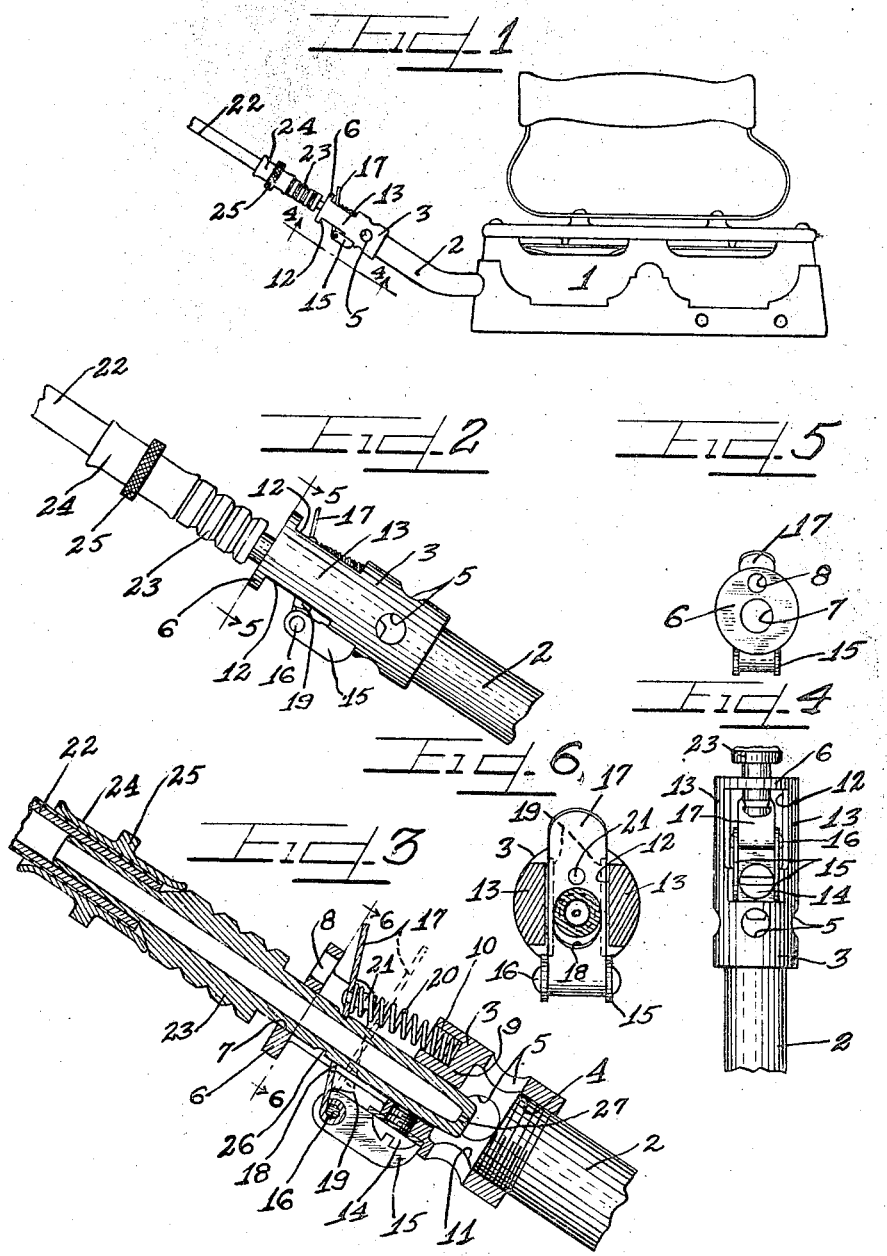

Patented Feb. 19, 1924.

1,484,528

UNITED STATES PATENT OFFICE.

HERMAN A. PAQUETTE, OF CHICAGO, ILLINOIS.

GAS-IRON HOSE CONNECTER.

Application filed March 2, 1922. Serial No. 540,393.

*To all whom it may concern:*

Be it known that I, HERMAN A. PAQUETTE, a citizen of the United States, and a resident of the city of Chicago, in the county of Cook and State of Illinois, have invented certain new and useful Improvements in a Gas-Iron Hose Connecter; and I do hereby declare that the following is a full, clear, and exact description of the same, reference being had to the accompanying drawings, and to the numerals of reference marked thereon, which form a part of this specification.

This invention relates more particularly to an improved type of a burner connecter adapted primarily for use in connecting a gas nozzle of a supply hose with the end of the gas intake pipe of a gas heated flat iron.

It is an object of this invention to provide an improved burner connecter adapted to permit a hose or flexible tube to be removably connected to a pipe.

It is also an object of the invention to provide a connecter wherein a spring controlled apertured lever is adapted to lockingly engage a notched plug to hold the plug locked in the connecter.

Another object of the invention is the provision of a gas connecter having air intake openings therein and adapted to removably receive the apertured end of a fuel supply nozzle removably locked therein to permit fuel passing from the nozzle to be ignited through said openings and mix with air before passing into a pipe to which the connecter is secured.

It is a further object of this invention to provide a connecter socket having a spring controlled apertured lever projecting transversely therethrough to lockingly engage a grooved plug when the same is projected into the connecter socket through the aperture in said lever.

It is an important object of this invention to provide a simple, inexpensive and easily releasable burner connecter adapted to be mounted on a pipe to removably receive a hose plug or burner nozzle lockingly engaged therein.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a gas iron having a gase hose connected thereto by means of a quick release connecter embodying the principles of this invention.

Figure 2 is an enlarged side view of the connecter connecting the plug of a gas hose with a pipe.

Figure 3 is a longitudinal section through the hose plug and the connecter.

Figure 4 is a view of the connecter taken on line 4—4 of Figure 1.

Figure 5 is an end view of the connecter taken on line 5—5 of Figure 2.

Figure 6 is a transverse section taken on line 6—6 of Figure 3.

As shown on the drawings:

The reference numeral 1 indicates a gas heated flat iron having a gas intake tube or or pipe 2 secured to one end thereof. The outer end of the pipe 2 is externally threaded to permit the interiorly threaded end of an improved burner connecter to be secured thereon.

The connecter comprises a cylindrical casing or housing 3 interiorly threaded at 4, the mounting end. Provided near the mounting end of the housing 3 are a plurality of circumferentially arranged air intake apertures or openings 5. The opposite end of the housing is closed by an end plate 6 having openings 7 and 8 therein. The housing 3 is provided with a passaged transverse wall or partition 9 having a recess or pocket 10 therein. A mixing or burner chamber 11 is provided in the housing and has the opening 5 communicating therewith. The plug receiving end of the housing or socket 3 is cut away at opposite sides to afford longitudinal openings or slots 12 between the partition 9 and the end plate 6, leaving two bars 13 connecting the end plate with the partition 9.

Rigidly secured by means of a screw 14 to one side of the housing 3 opposite the recess 10 in the partition plate, is a two arm bracket 15. A pivot pin 16 connects the arms of the bracket 15. Pivotally engaged on the pin 16 is one end of a locking lever 17 having an opening 18 therein. The sides of the lever are bent at an angle to afford guide flanges 19. Seated in the partition wall recess 10 is one end of a coiled control spring 20, the other end of which is engaged around a pin or rivet 21 secured to the lever 17. The lever 17 projects through the housing openings 12 and is held in an elevated inclined position as illustrated in full lines in Figure 3, by the action of the control spring 20.

The reference numeral 22 indicates a gas supply tube or hose adapted to have one end connected to a gas supply jet or cock not shown. The other end of the gas hose 22 has secured therein a nozzle or plug 23. The plug 23 is held secured in the end of the gas hose 22 by a retaining collar or sleeve 24 having a knurled flange 25. The plug is longitudinally passaged and is provided with a peripheral groove 26 for coaction with the apertured lever 17. The outer end of the plug is closed and is provided with a small gas discharge aperture 27.

The operation is as follows:

The connecter is adapted to be threaded onto the end of the flat iron pipe 2, as illustrated in Figure 3, with the mixing chamber 11 positioned adjacent the end of the pipe 2. To connect the gas supply hose 22 with the flat iron 1 the plug 23 is inserted through the end plate opening 7 of the connecter housing. The slightly tapered end of the plug 23 passes through the lever opening 18 and then through the partition opening into the mixing chamber 11 between the air intake openings 5. The gas discharge aperture 27 is thus positioned adjacent the open end of the flat iron intake pipe 2. The plug 23 is pushed into the connecter until the plug groove 26 reaches the lever 17 at which time the spring 20 acts to engage the inclined lever in said groove. When this occurs the plug is locked in the connecter by the lever 17 against retraction.

When the supply of gas is turned on, gas flows through the hose 22 and the plug 23 and is discharged through the nozzle aperture 27 into the mixing chamber 11. The opening 5 causes a draft inwardly through the pipe 2 and through the flat iron 1. The gas is lighted through the connecter openings 5 thereby causing the resulting gas flame to be directed into the pipe 2 to heat the flat iron.

To remove the plug 23 from the connecter, the plug 23 and the lever are moved inwardly until the lever 17 reaches the dotted line position of Figure 3 at right angles to the plug 23. The plug may now be retracted through the lever opening 18 and from the connecter housing. Upon release of the lever the compressed control spring 20 acts to return the lever into its normal position.

I am aware that numerous details of construction may be varied through a wide range without departing from the principles of this invention, and I therefore do not purpose limiting the patent granted otherwise than necessitated by the prior art.

I claim as my invention:

1. A gas iron hose connecter comprising a housing, a passaged partition therein, said housing having a plurality of circumferentially arranged openings therein on one side of the partition and a pair of oppositely disposed openings therein on the opposite side of the partition, a bracket secured to said housing, an apertured lever pivotally supported on said bracket and projecting through said oppositely disposed housing openings, and a spring in said housing engaging said lever to hold the same in an inclined position with respect to the housing.

2. A connecter of the class described comprising an apertured housing, an apertured lever pivotally supported thereon and propecting therethrough with the aperture therein substantially aligned with the aperture in the housing, and a spring in said housing connected with the lever for holding the same in a locking position.

3. A connecter of the class described comprising an apertured housing having an apertured partition integrally formed transversely therein, a bracket supported on the housing, a pin thereon, an apertured lever pivoted on said pin and projecting through said housing, said housing adapted to have a peripherally grooved plug inserted therein projecting through the apertured lever, and means in said housing for holding said lever at an inclined angle with respect to said plug to permit the lever to engage in the lever groove to hold the plug locked in said housing.

4. The combination with an apertured connecter housing, of a spring controlled apertured lever pivotally supported on the housing and projecting therethrough, and a plug having a peripheral groove adapted to be projected into the housing through the apertured lever to permit the lever to engage in said groove to hold the plug locked in the housing.

5. The combination with an apertured housing and a grooved plug adapted to be inserted therein, of a pivoted apertured member on said housing adapted to receive the plug and engage in the groove thereof to hold the plug locked within the housing.

6. The combination with an apertured connecter housing having a mixing chamber therein, of a grooved plug adapted to be projected into the housing and into the combustion chamber thereof, an apertured lever pivoted on the housing and projecting therethrough to permit the plug to be inserted therethrough, guide members integrally formed on said lever, and resilient means in said housing adapted to hold the lever inclined with respect to the plug to permit the lever to engage in the plug groove to hold the plug locked in the housing, said lever adapted to be depressed to permit release of the plug and withdrawal thereof from the housing.

In testimony whereof I have hereunto subscribed my name in the presence of two subscribing witnesses.

HERMAN A. PAQUETTE.

Witnesses:
 FRED E. PAESLER,
 JAMES N. O'BRIEN.